(12) United States Patent
Fujieda

(10) Patent No.: US 9,092,396 B2
(45) Date of Patent: Jul. 28, 2015

(54) STANDBY SYSTEM DEVICE, A CONTROL METHOD, AND A PROGRAM THEREOF

(71) Applicant: Tsuyoshi Fujieda, Tokyo (JP)

(72) Inventor: Tsuyoshi Fujieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 201 days.

(21) Appl. No.: 13/752,165

(22) Filed: Jan. 28, 2013

(65) Prior Publication Data

US 2013/0254588 A1    Sep. 26, 2013

(30) Foreign Application Priority Data

Mar. 21, 2012    (JP) .................. 2012-063706

(51) Int. Cl.
*G06F 11/07* (2006.01)
*G06F 11/20* (2006.01)
*G06F 9/50* (2006.01)
*G06F 11/34* (2006.01)

(52) U.S. Cl.
CPC .............. *G06F 11/2023* (2013.01); *G06F 9/50* (2013.01); *G06F 11/2038* (2013.01); *G06F 11/3409* (2013.01)

(58) Field of Classification Search
CPC ............ G06F 11/2023; G06F 11/2028; G06F 11/2033
USPC .................................................. 714/4.11, 6.3
See application file for complete search history.

(56) References Cited

U.S. PATENT DOCUMENTS

| | | | |
|---|---|---|---|
| 2003/0195942 A1* | 10/2003 | Muhlestein et al. .......... | 709/215 |
| 2005/0262508 A1* | 11/2005 | Asano et al. .................. | 718/100 |
| 2007/0180314 A1 | 8/2007 | Kawashima et al. | |
| 2010/0036894 A1* | 2/2010 | Senda et al. .................. | 707/202 |
| 2010/0235488 A1* | 9/2010 | Sharma et al. ................ | 709/223 |
| 2011/0138475 A1* | 6/2011 | Gordon et al. ................. | 726/26 |
| 2012/0011333 A1* | 1/2012 | Miki et al. .................... | 711/154 |
| 2012/0030503 A1* | 2/2012 | Li et al. ........................ | 714/4.11 |
| 2012/0036169 A1* | 2/2012 | Grinshpun et al. ........... | 707/803 |

FOREIGN PATENT DOCUMENTS

JP    3248485 B2    1/2002

OTHER PUBLICATIONS

European Search Report dated Jul. 12, 2013.

* cited by examiner

*Primary Examiner* — Chae Ko
(74) *Attorney, Agent, or Firm* — McGinn IP Law Group, PLLC

(57) ABSTRACT

A standby system device 200 which is connected to an active system device 100 includes a process information sharing unit 203B and a standby process management unit 203C. The process information sharing unit 203B receives active side process information indicating usage of resources of an active system process 103A operating on the active system device 100 from the active system device 100. The standby process management unit 203C terminates a standby process 203A before activating a takeover process 203D used for taking over processing of the active system process 103A when a takeover of the active system process is requested on the standby system device 200, the standby process 203A referring to the active side process information and acquiring resources in such a way that usage of resources of the standby process 203A is equal to or greater than the usage of resources of the active system process 103A.

10 Claims, 9 Drawing Sheets

STANDBY SYSTEM DEVICE, A CONTROL METHOD, AND A PROGRAM THEREOF

This application is based upon and claims the benefit of priority from Japanese Patent Application No. 2012-063706, filed on Mar. 21, 2012, the disclosure of which is incorporated herein in its entirety by reference.

TECHNICAL FIELD

The present invention relates to a cluster system in which an active system device and a standby system device are connected by a network.

BACKGROUND ART

In a cluster system in which an active system device and a standby system device are connected by a network, at the time of a failure, fault, or periodic maintenance of the active system device, service processing performed on the active system device is taken over by the standby system device. However, because there is no guarantee that the takeover is carried out without fail, the reliability of the system decreases.

There are some factors which cause the failure of the takeover of the service processing. The biggest factor in this is a shortage of resources in the standby system device. In order to take over the service processing performed in the active system device by the standby system device, the standby system device has to acquire an amount of resources that is greater than the amount of resources (for example, a memory amount, a disk capacity, or the like) that is used in the active system device to perform the service processing. However, in the cluster system that is not configured as a hot standby, at a time at which the takeover is required, a process for the takeover is activated in the standby system device and the resources are acquired. Therefore, a status in which a sufficient amount of resources cannot be acquired occurs because of the shortage of resources in the standby system device at the time.

Accordingly, in order to prevent a failure of the takeover of the service processing caused by the shortage of resources in the standby system device, the following technology is proposed (for example, refer to Japanese Patent Publication No. 3248485). First, the active system device periodically detects usage of resources and notifies the standby system device. The standby system device compares the usage of the resources that is reported with an available amount of resources of the standby system device. When the available amount of resources of the standby system device is smaller than the usage of the resources of the active system device that is reported, the standby system device determines that the fault occurs and transmits a report showing abnormality.

SUMMARY

An exemplary object of the present invention is to solve the above-mentioned problem, that is the problem in which it is difficult to secure the amount of resources required for the takeover in the standby system device until the time of the takeover.

A standby system device which is connected to an active system device according to an exemplary aspect of the invention includes a process information sharing unit which receives active side process information indicating usage of resources of an active system process operating on the active system device from the active system device, and a standby process management unit which terminates a standby process before activating a takeover process that is used for taking over processing of the active system process when a takeover of the active system process is requested on the standby system device, the standby process referring to the active side process information and acquiring resources in such a way that usage of resources of the standby process is equal to or greater than the usage of resources of the active system process.

A control method of a standby system device connected to an active system device according to an exemplary aspect of the invention includes receiving active side process information indicating usage of resources of an active system process operating on the active system device from the active system device, and terminating a standby process before activating a takeover process that is used for taking over processing of the active system process when a takeover of the active system process is requested on the standby system device, the standby process referring to the active side process information and acquiring resources in such a way that usage of resources of the standby process is equal to or greater than the usage of resources of the active system process.

A non-transitory computer readable storage medium recording thereon a program according to an exemplary aspect of the invention causes a standby system device connected to an active system device to function as a process information sharing unit which receives active side process information indicating usage of resources of an active system process operating on the active system device from the active system device, and a standby process management unit which terminates a standby process before activating a takeover process that is used for taking over processing of the active system process when a takeover of the active system process is requested on the standby system device, the standby process referring to the active side process information and acquiring resources in such a way that usage of resources of the standby process is equal to or greater than the usage of resources of the active system process.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment of the present invention will be described in detail with reference to the drawings.

[First Exemplary Embodiment]

Figure 1:
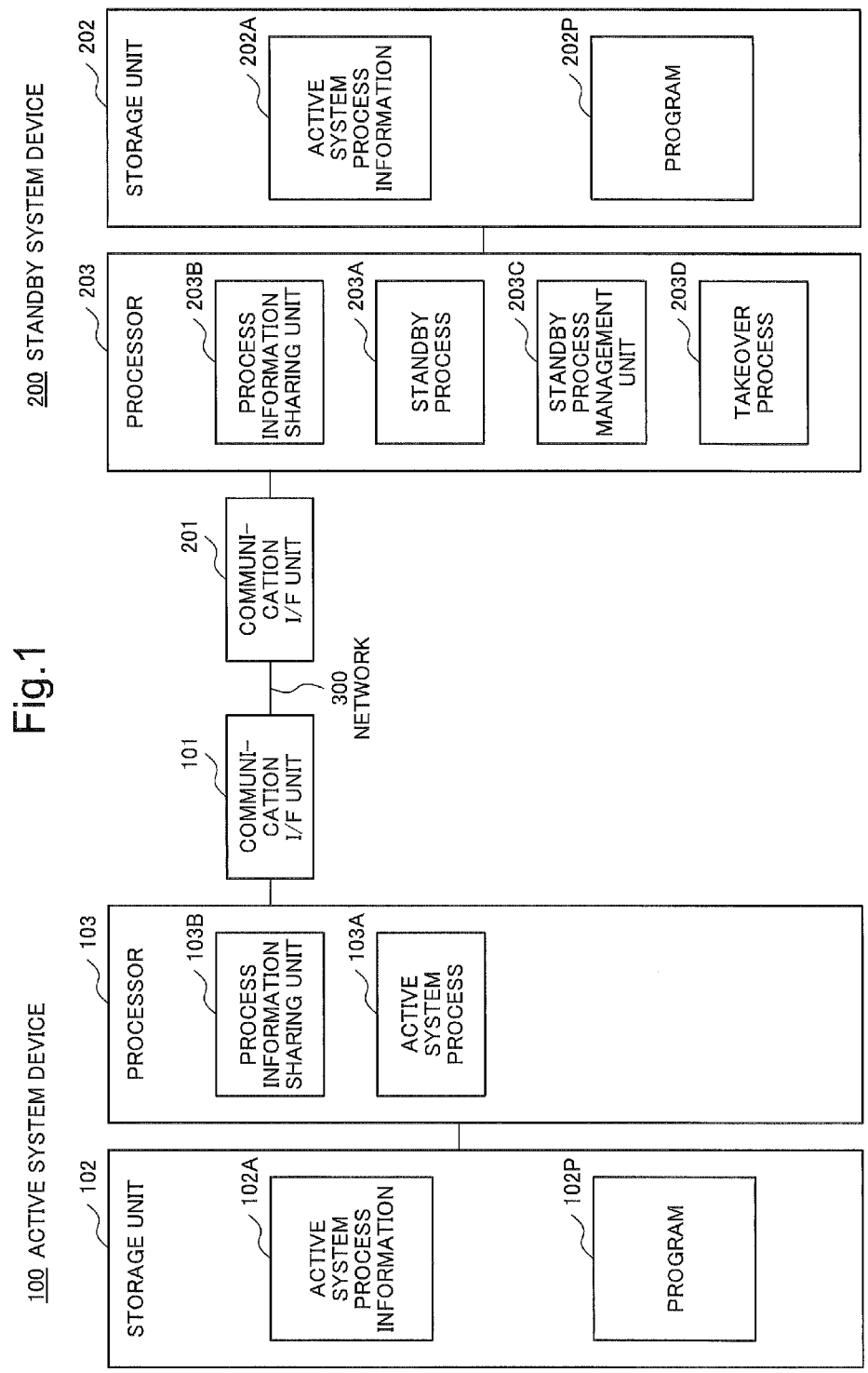
FIG. 1 is an exemplary block diagram of a cluster system according to a first exemplary embodiment of the present invention.

Referring to FIG. 1, in a cluster system according to a first exemplary embodiment of the present invention, an active system device 100 and a standby system device 200 are connected by a network 300.

The active system device 100 is an information processing device such as a server for performing service processing. The standby system device 200 is an information processing device such as a server for taking over the service processing performed by the active system device 100 at the time of a failure, fault, or periodic maintenance of the active system device 100.

The active system device 100 includes a communication I/F unit (communication interface unit) 101, a storage unit 102, and a processor 103 as hardware.

The communication I/F unit 101 is composed of a dedicated data communication circuit. The communication I/F unit 101 performs data communication with various devices such as the standby system device 200 that is connected, via the network 300.

The storage unit 102 is composed of a storage device such as a hard disk or a memory. The storage unit 102 stores processing information and a program 102P required for various processes in the processor 103. The program 102P is a program for realizing various processing units by being read in the processor 103 and executed. The program 102P is read from an external device (not shown) or a storage medium (not shown) via a data input/output function of the communication I/F unit 101 or the like in advance and stored in the storage unit 102. The storage unit 102 stores active system process information 102A as a main processing information.

The active system process information 102A indicates usage of resources of an active system process 103A for performing the service processing in the active system device 100. The active system process 103A is performed by the processor 103. The usage of resources is, for example, an amount of a memory, an amount of a disk, or the like.

The processor 103 includes a microprocessor such as a CPU and a peripheral circuit of it. The processor 103 reads the program 102P from the storage unit 102 and executes it. By this, the processor 103 realizes various processing units by operating the above-mentioned hardware and the program 102P in cooperation with each other. A main processing unit realized by the processor 103 is a process information sharing unit 103B.

The process information sharing unit 103B periodically investigates the usage of the resources of the active system process 103A and updates the usage of the resources of the active system process 103A stored in the active system process information 102A based on a result of the investigation. Further, the process information sharing unit 103B periodically reads the usage of the resources of the active system process 103A from the active system process information 102A and transmits it to the standby system device 200 through the network 300.

The standby system device 200 includes a communication I/F unit (communication interface unit) 201, a storage unit 202, and a processor 203 as hardware.

The communication I/F unit 201 is composed of the dedicated data communication circuit. The communication I/F unit 201 performs data communication with various devices such as the active system device 100 that are connected via the network 300.

The storage unit 202 is composed of a storage device such as a hard disk or a memory. The storage unit 202 stores processing information and a program 202P required for various processes in the processor 203. The program 202P is a program for realizing various processing units by being read in the processor 203 and executed. The program 202P is read from an external device (not shown) or a storage medium (not shown) via a data input/output function of the communication I/F unit 201 or the like in advance and stored in the storage unit 202. The storage unit 202 stores active system process information 202A as a main processing information.

The active system process information 202A is a copy of the active system process information 102A indicating the usage of the resources of the active system process 103A which performs the service processing in the active system device 100.

The processor 203 includes a microprocessor such as a CPU and a peripheral circuit of it. The processor 203 reads the program 202P from the storage unit 202 and executes it. By this, the processor 203 realizes various processing units by operating the above-mentioned hardware and the program 202P in cooperation with each other. Main processing units realized by the processor 203 are a process information sharing unit 203B and a standby process management unit 203C.

The process information sharing unit 203B updates the usage of the resources of the active system process 103A that is stored in the active system process information 202A based on the usage of the resources of the active system process 103A that is periodically received from the active system device 100 through the network 300.

The standby process management unit 203C activates a takeover process 203D that takes over the service processing performed by the active system process 103A. Further, the standby process management unit 203C activates a standby process 203A beforehand in order to secure amount of resources required for the takeover process 203D at the time of the takeover.

The standby process 203A periodically refers to the usage of the resources of the active system process 103A stored in the active system process information 202A and acquires the resources in such a way that usage of the resources of the standby process is equal to or greater than the usage of the resources of the active system process 103A. However, the standby process 203A does not perform the processing of the service that uses the acquired resources.

When the standby process management unit 203C receives, for example, a takeover request of the active system process 103A from the active system device 100 through the network 300, the standby process management unit 203C transmits a termination request to the standby process 203A just before activating the takeover process 203D.

Next, operation of the cluster system according to the exemplary embodiment will be described with reference to FIG. 1 and FIG. 2.

In an initial state, the active system process 103A and the process information sharing unit 103B operate in the active system device 100. Further, the standby process 203A, the process information sharing unit 203B, and the standby process management unit 203C operate in the standby system device 200.

Figure 2:
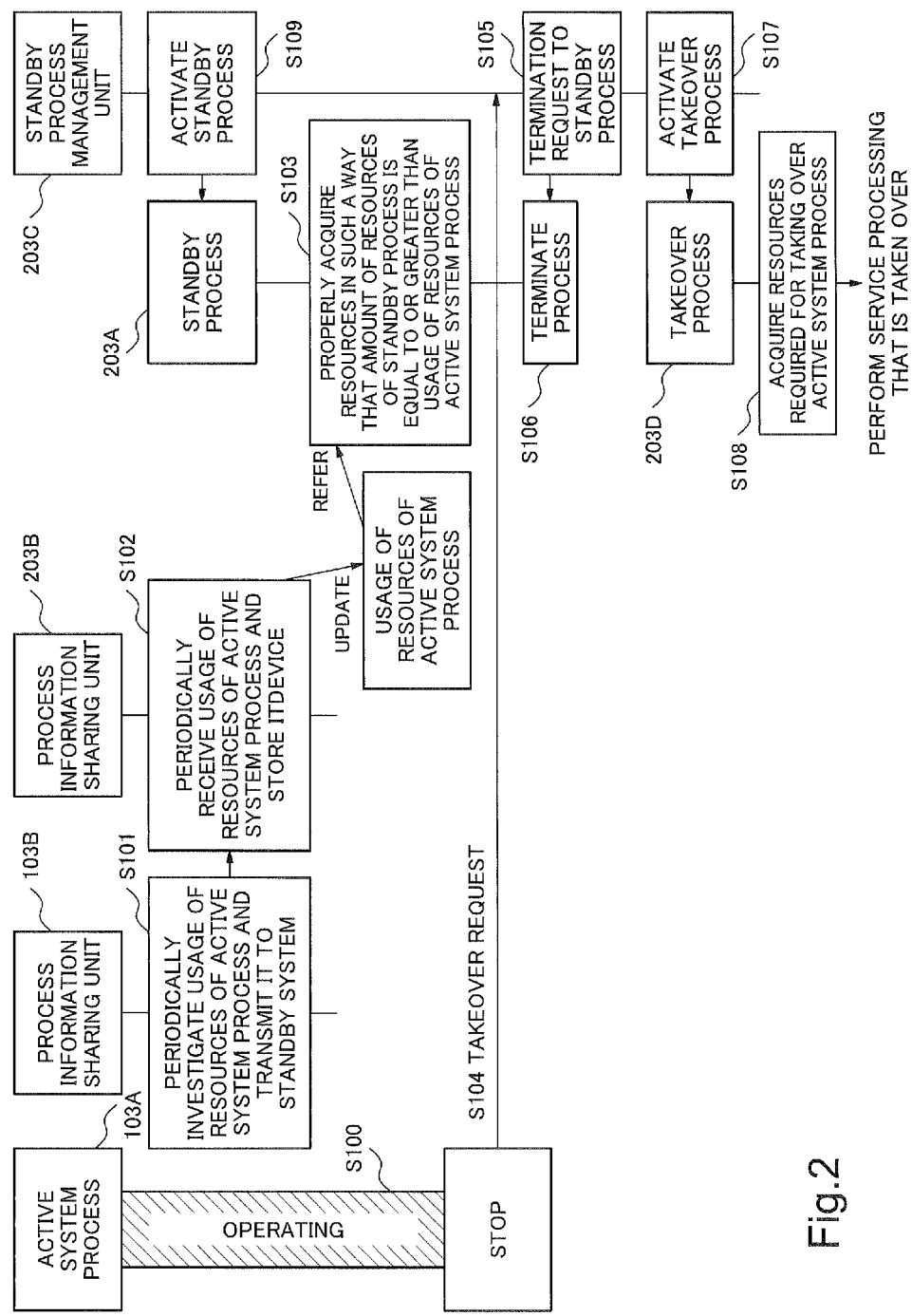
FIG. 2 is an exemplary flow chart showing processing of the cluster system according to the first exemplary embodiment of the present invention.

The active system process 103A is performing the service processing while properly acquiring the resources required for the service processing (S100 in FIG. 2). The process information sharing unit 103B of the active system device 100 investigates usage of the resources of the active system process 103A, stores a result in the active system process information 102A, and transmits it to the standby system device 200 periodically during the active system process 103A is operating (S101).

When the process information sharing unit 203B of the standby system device 200 receives the usage of the resources of the active system process from the active system device 100, the process information sharing unit 203B reflects it in the active system process information 202A (S102). As a result, the active system process information 202A of the standby system device 200 is consistent with the active system process information 102A of the active system device 100.

On the other hand, the standby process 203A of the standby system device 200 periodically refers to the usage of the resources of the active system process 103A that is stored in the active system process information 202A. The standby process 203A properly acquires the resources in such a way that usage of the resources of the standby process does not become smaller than the usage of the resources of the active system process 103A (S103). For example, when current amount of memory of the standby process 203A is smaller than amount of memory of the active system process 103A, the standby process 203A newly acquires the amount of memory that is equal to the amount of the shortage. With respect to other kinds of the resources, the standby process 203A acquires the resources in such a way that the amount of the resources of the standby process is not smaller than the usage of the resources of the active system process 103A. Moreover, when the current amount of memory of the standby process 203A is greater than the amount of memory of the active system process 103A, the standby process 203A releases all of the excess amount or a part of the excess amount. With respect to other kinds of the resources, the standby process 203A releases all of the excess amount or a part of the excess amount when the amount of the resources of the standby process is greater than the usage of the resources of the active system process 103A. However, the standby process 203A may not perform the processing of releasing all of the excess amount or a part of the excess amount when the amount of the resources of the standby process 203A is greater than the usage of the resources of the active system process 103A.

When a failure or the like occurs in the active system device 100 and a takeover request of the service processing performed on the active system process 103A to the standby system device 200 occurs (S104), the standby process management unit 203C of the standby system device 200 transmits a termination request to the standby process 203A just before activating the takeover process 203D (S105). In response to this, the standby process 203A terminates the standby process (S106). By this, the resources secured by the standby process 203A is released. After that, the standby process management unit 203C activates the takeover process 203D (S107). The takeover process 203D acquires the resources required for taking over the service processing performed by the active system process 103A and takes over the processing (S108). The resources acquired by the standby process 203A has been released just before the takeover process 203D is activated. The amount of the released resources is equal to or greater than the usage of the resources of the active system process 103A. Accordingly, the takeover process 203D can acquire the resources without problem. For this reason, a failure of the takeover caused by shortage of the resources does not occur.

Next, a characteristic configuration of the first exemplary embodiment is described.

Figure 9:
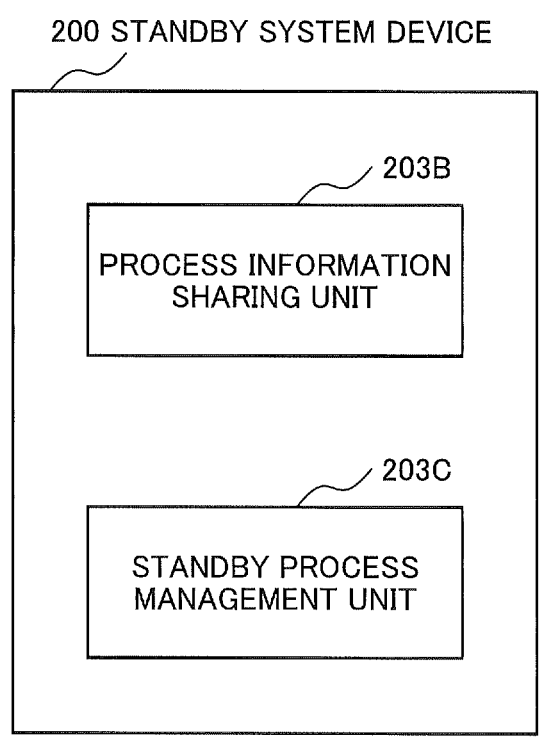
FIG. 9 is an exemplary block diagram showing a characteristic configuration of a standby system device according to the first exemplary embodiment of the present invention.

FIG. 9 is an exemplary block diagram showing a characteristic configuration of the standby system device according to the first exemplary embodiment of the present invention. Referring to FIG. 9, a standby system device 200 which is connected to an active system device 100 includes a process information sharing unit 203B and a standby process management unit 203C. The process information sharing unit 203B receives active side process information indicating usage of resources of an active system process 103A operating on the active system device 100 from the active system device 100. The standby process management unit 203C terminates a standby process 203A before activating a takeover process 203D that is used for taking over processing of the active system process 103A when a takeover of the active system process is requested on the standby system device 200, the standby process 203A referring to the active side process information and acquiring resources in such a way that usage of resources of the standby process 203A is equal to or greater than the usage of resources of the active system process 103A.

As described above, according to the exemplary embodiment, the amount of resources required for the takeover in the standby system device can be secured until the time of performing the takeover. The reason is because the standby process 203A, for securing the amount of resources that is equal to or greater than the usage of the resources of the active system process 103A, operates in the standby system device 200 during the active system process 103A is operating, and, when the take over request of the service processing of the active system process 103A occurs, the standby process 203A is stopped just before activating the takeover process 203D in the standby system device 200.

In the exemplary embodiment, the standby process management unit 203C has activated the standby process 203A before the takeover request occurs (S109). In this case, it is desirable that the standby process management unit 203C activates the standby process 203A simultaneously when the active process 103A is activated.

[Second Exemplary Embodiment]
[Feature of the Exemplary Embodiment]

In the exemplary embodiment, even in the process which does not support a hot standby, a certain takeover of a process that is the feature of the hot standby can be realized without cost.

[Problems to be Solved by the Exemplary Embodiment]

In the cluster system, a hot standby is a typical technology of a resident process in the standby system device. In the hot standby, identical processes operate in both the active system and the standby system. Therefore, the hot standby has a feature in which a failure of the takeover due to a failure of activation of the process does not occur. Hereinafter, this feature is called "certainty of process takeover". There are two main problems to realize this feature.

(problem 1) a corresponding cost is required in case the process supports the hot standby.

(problem 2) the clusterware has a function of process takeover but it does not guarantee the certainty of process takeover.

On the other hand, a process supporting the hot standby has the following two functions.

(a) a function that a process operating in the standby system in advance takes over processing when a failure occurs in a process of the active system.

(b) a function to protect shared data from being destroyed when processes are simultaneously operated in a plurality of devices.

In order to realize the hot standby, the process has to support the hot standby and a corresponding supporting cost is required. This is the (problem 1).

On the other hand, the clusterware has the following two functions.

(c) a function that a process is activated in the standby system when a failure occurs in a process of the active system and the activated process takes over the processing.

(d) a function to protect shared data from being destroyed by performing a control in such a way that processes are not simultaneously operated in a plurality of devices.

Because the supporting cost is not required in the process, the clusterware is superior to the hot standby. However, in the clusterware, identical processes cannot be operated, in both the active system and the standby system, simultaneously. This is a difference between the clusterware and the hot standby. By this difference, in the clusterware, the certainty of process takeover cannot be realized. In order to realize the certainty of process takeover in the clusterware, the above-mentioned function (b) has to be realized. However, it has been considered that it is difficult to realize the function (b) without the supporting cost in the process because the realization of the function (b) contradicts the problem 1. This is the (problem 2).

[Means for Solving the Problems]

In the exemplary embodiment, the certainty of process takeover is realized while protecting the shared data by simulating a resource utilization status of the process of the active system in the standby system.

The resource utilization status of the process can be checked by using an interface of an OS even from the outside of the process. In the exemplary embodiment, by utilizing this fact, the resource utilization status that is the same as that of the process in the active system is reproduced in the standby system. In the exemplary embodiment, without the supporting cost in the process, the resources required in the standby system are secured and the certainty of process takeover that is one of the features of the hot standby is realized.

[Configuration of the Exemplary Embodiment]

A configuration of a cluster system according to the exemplary embodiment will be described with reference to FIG. 3.

Figure 3:
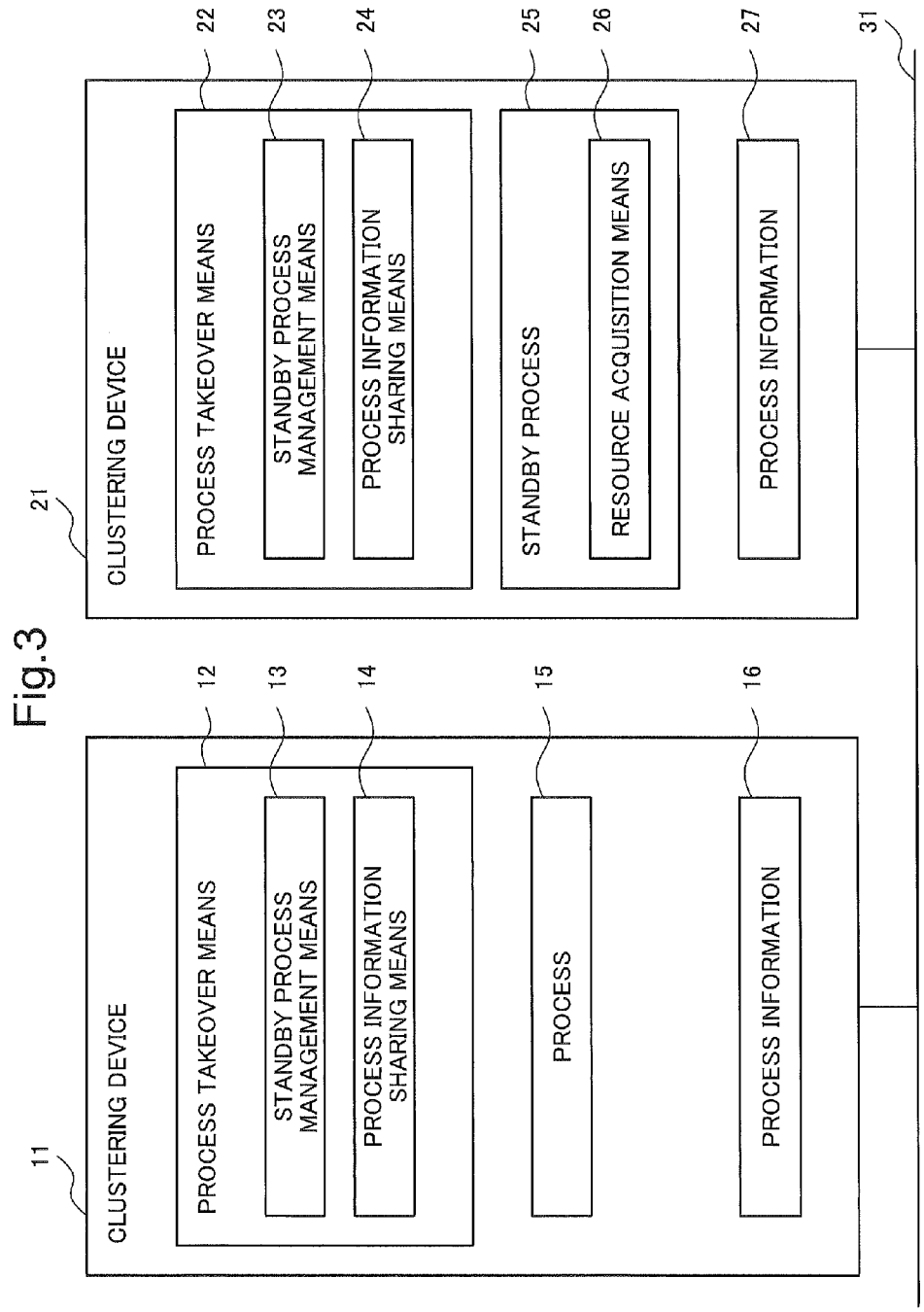
FIG. 3 is an exemplary block diagram of a cluster system according to a second exemplary embodiment of the present invention.

In FIG. 3, clustering devices 11 and 21 are processing devices installed in separate enclosures.

The clustering device 11 is a device of an active system in the cluster system. The clustering device 11 includes process takeover means 12, a process 15, process information 16, and the like.

The clustering device 21 is a device of a standby system in the cluster system. The clustering device 21 includes process takeover means 22, a standby process 25, process information 27, and the like.

When a failure occurs in the clustering device 11 or the clustering device 21, the process takeover means 12 or 22 takes over the process of the clustering device 11 or 21. The process takeover means 12 and 22 include standby process management means 13 and 23, process information sharing means 14 and 24, and the like.

In order to secure resources required when taking over the process 15, the standby process management means 13 and 23 manage generation and termination of the standby process 25. The standby process management means 23 generates the standby process 25 in the clustering device 21. Further, the standby process management means 23 terminates the standby process 25 at the time of process takeover and releases resources required for taking over the process 15.

The process information sharing means 14 obtains resource utilization status of the process 15 and record the information in the process information 16. Further, the process information sharing means 14 transmits the process information 16 to the clustering device 21 via a network 31. The process information sharing means 24 receives the process information 16 and stores it in the process information 27.

The process 15 exists in the clustering device 11 and performs processing of the service. The standby process 25 exists in the clustering device 21 and does not perform processing of the service. The existence of the process 15 and the existence of the standby process 25 are managed by the standby process management means 13 and 23. The process 15 and the standby process 25 are controlled so as not to exist simultaneously in the clustering devices 11 and 21.

The standby process 25 acquires resources in the clustering device 21 by resource acquisition means 26 and maintains its resource acquisition state until the time of taking over the process. The resource acquisition means 26 determines acquisition amount of the resources based on the process information 27 and acquires the resources. As a result, the acquisition amount of the resources of the standby process 25 is made equal to the acquisition amount of the resources of the process 15.

The process information 16 and 27 are files in which the resource utilization status of the process 15 is recorded.

The entire configuration of the exemplary embodiment is shown in FIG. 3. The exemplary embodiment has a feature in which the standby process 25 dynamically reproduces the resource utilization status that is the same as that of the process 15 of the clustering device 11 in the clustering device 21 by using the process information 27.

Figure 4:
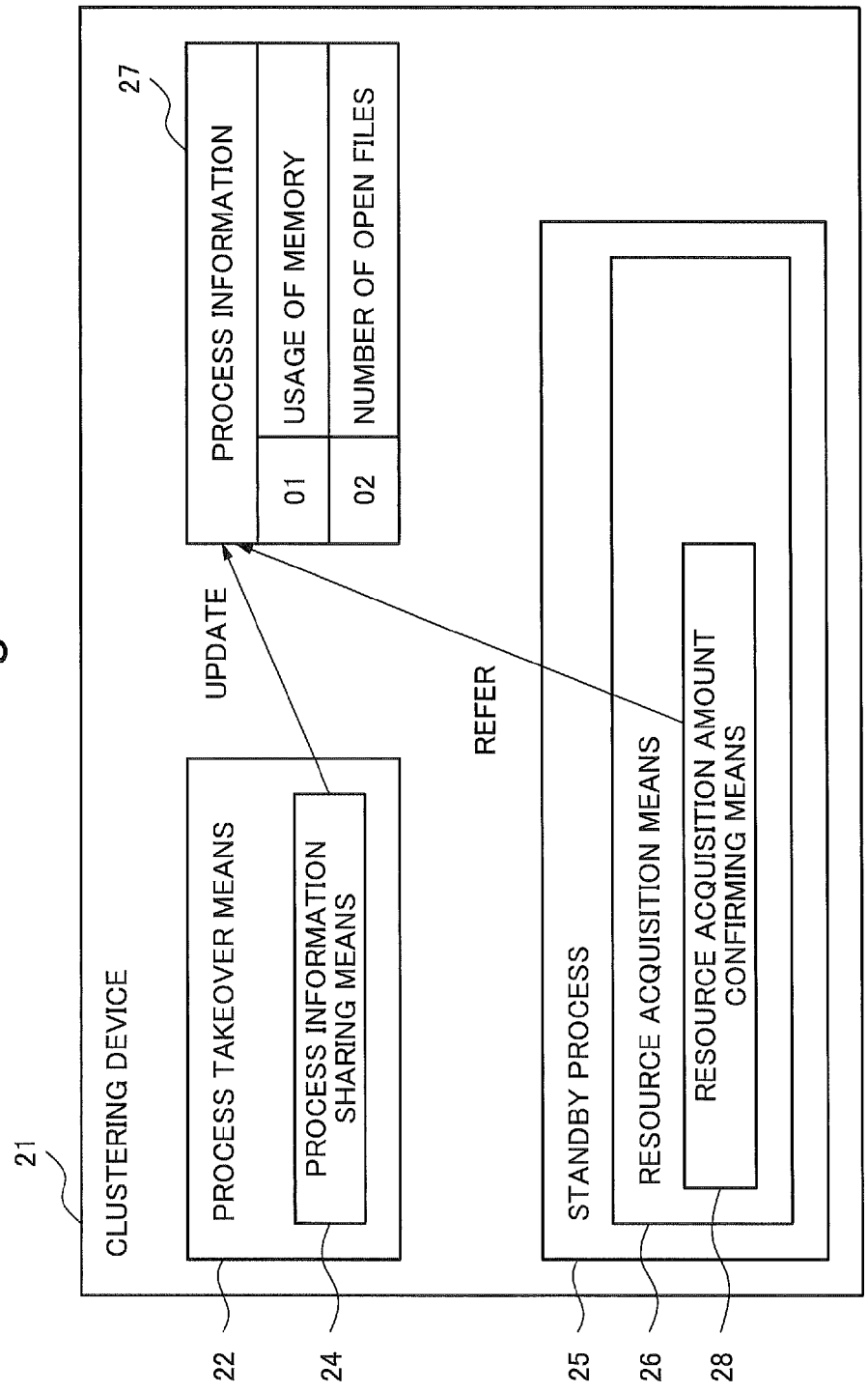
FIG. 4 is an exemplary block diagram of a standby system in the cluster system according to the second exemplary embodiment of the present invention.

The detailed configuration of the clustering device 21 is shown in FIG. 4.

The process information 27 is periodically updated by the process information sharing means 24. As a result, the resource utilization status of the process 15 operating in the clustering device 11 can be grasped by the clustering device 21.

The resource acquisition means 26 includes resource acquisition amount confirming means 28. The resource acquisition amount confirming means 28 refers to the process information 27 that is periodically updated and determines the acquisition amount of the resources of the standby process 25. By the resource acquisition amount confirming means 28, the standby process 25 can dynamically reproduce the resource utilization status that is similar to that of the process 15 operating in the clustering device 11.

[Operation of the Exemplary Embodiment]

Figure 5:
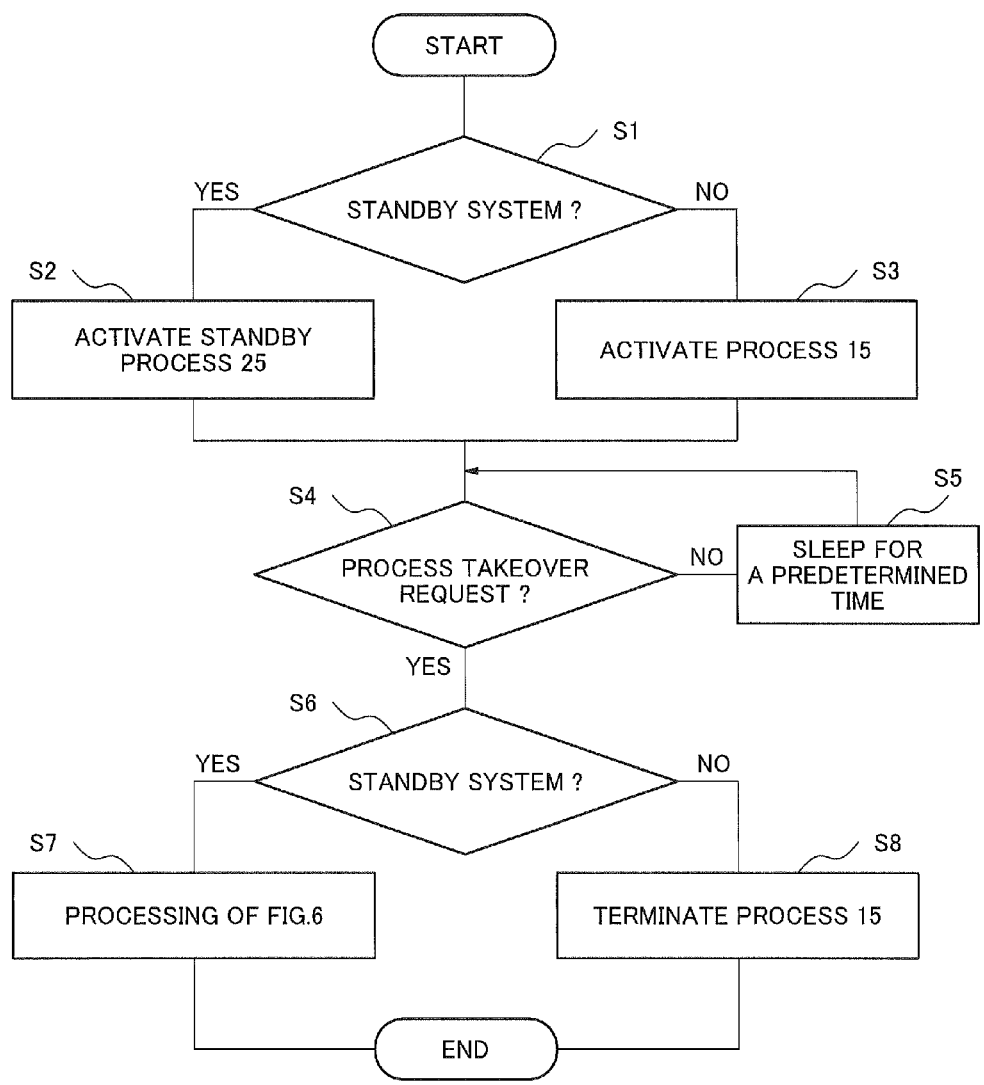
FIG. 5 is an exemplary flow chart showing a process activation processing in the cluster system according to the second exemplary embodiment of the present invention.

A flow of process activation processing of the process takeover means 12 and 22 is shown in FIG. 5. A difference from the existing technology of the clusterware is that the process takeover means 22 of the standby system activates the standby process 25 (S2).

Referring to FIG. 5, the process takeover means 12 of the active system activates the process 15 (S1/NO, S3). After that, when a process takeover request occurs (S4/YES), the process takeover means 12 terminates the process 15 (S6/NO, S8).

On the other hand, the process takeover means 22 of the standby system activate the standby process 25 (S1/YES, S2). After that, when the process takeover request occurs (S4/NO), the process takeover means 22 performs processing shown in FIG. 6 (S6/YES, S7).

Figure 7:
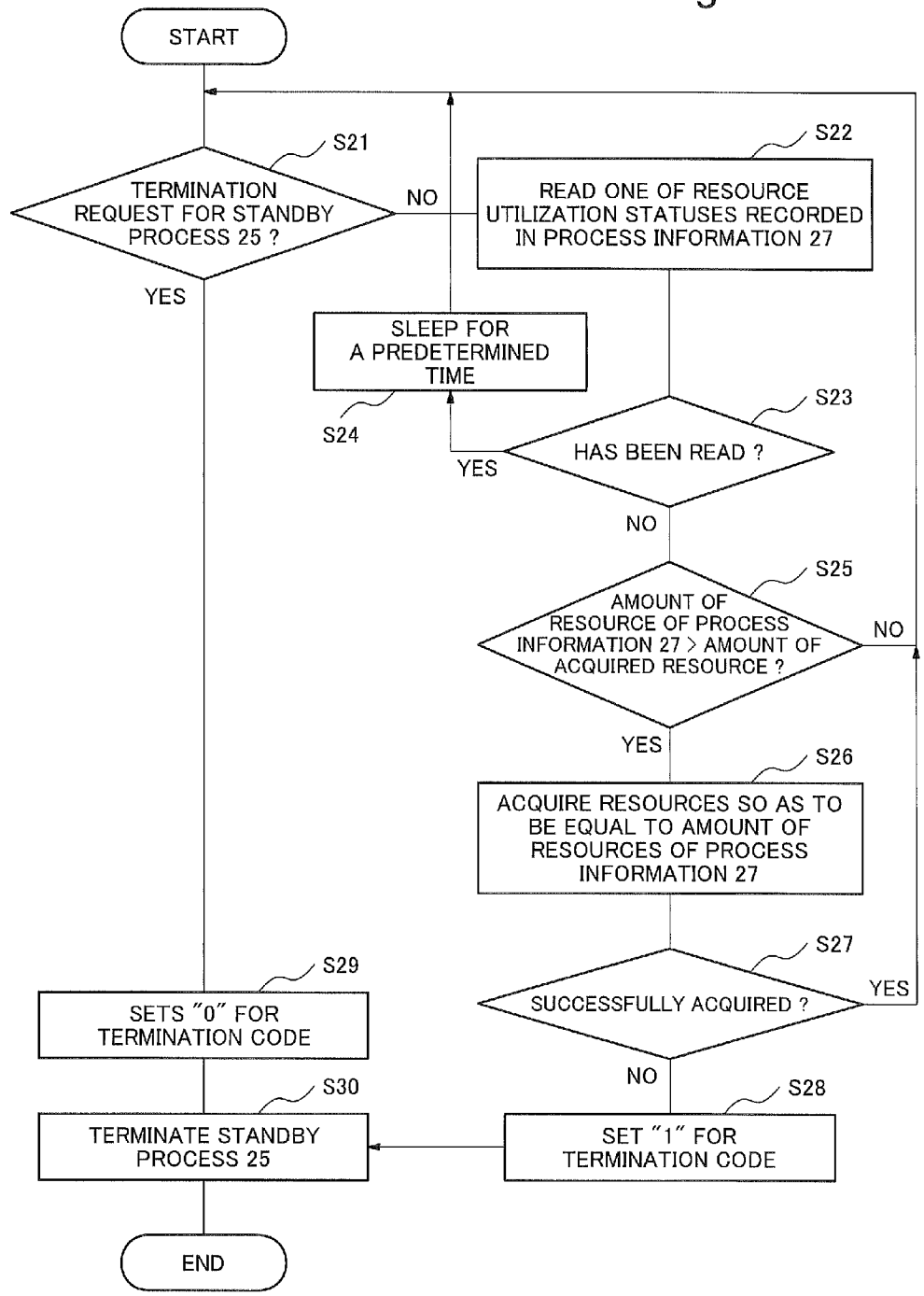
FIG. 7 is an exemplary flow chart showing processing of a standby process in the cluster system according to the second exemplary embodiment of the present invention.

The processing flow of the activated standby process 25 is shown in FIG. 7. The standby process 25 determines whether or not a termination request (a signal for requesting termination) is received (S21). When the termination request is not received (S21/NO), the standby process 25 reads one of the resource utilization statuses recorded in the process information 27 (S22). When all of the resource utilization statuses recorded in the process information 27 have been read (S23/YES), the standby process 25 waits for a given length of time (S24) and after this, returns to step S21.

When one of the resource utilization status is successfully read from the process information 27 (S23/NO), the standby process 25 compares the amount of resource that is read with the amount of resource that have been acquired and if the amount of resource that have been acquired is smaller than the amount of resource that is read (S25/YES), acquires the resource so as to be equal to the amount of resource of the process information 27 (S26). When the resource is successfully acquired (S27/YES), the standby process 25 returns to step S21. On the other hand, when the acquisition of the resource fails (S27/NO), the standby process 25 sets a value of "1" for a termination code (S28) and the standby process 25 is terminated (S30).

Further, when the standby process 25 receives the termination request (S21/YES), the standby process 25 sets a value of "0" for the termination code (S29) and terminates the standby process 25 (S30).

Figure 6:
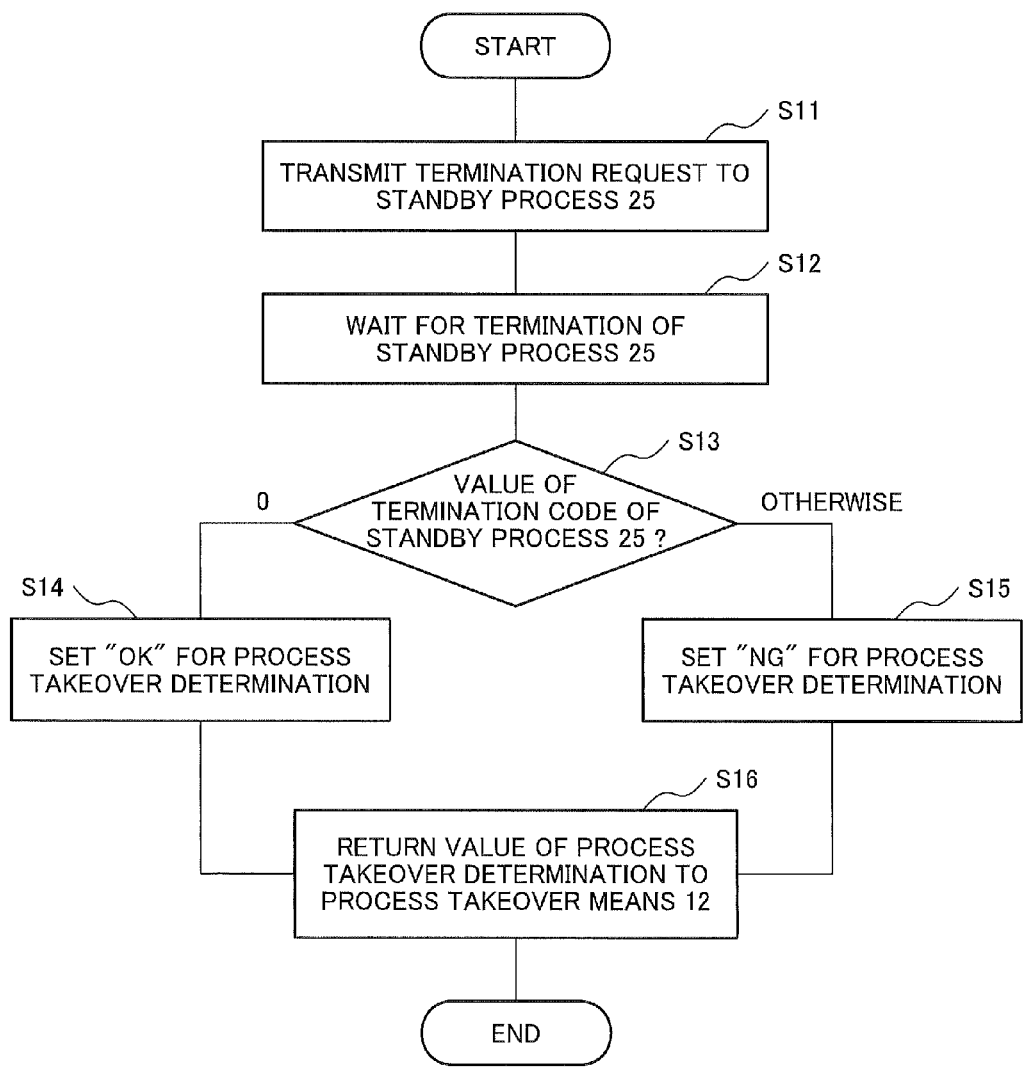
FIG. 6 is an exemplary flow chart showing processing performed when a standby system device in the cluster system according to the second exemplary embodiment of the present invention receives a process takeover request.

A processing flow of step S7 shown in FIG. 5, that is a processing flow performed when the process takeover means 22 receives the process takeover request from the process takeover means 12, is shown in FIG. 6. First, the process takeover means 22 transmits the signal for requesting termination to the standby process 25 (S11) and waits for the termination of the standby process 25 (S12). The process takeover means 22 determines whether the value of the termination code of the standby process 25 is "1" or "0" (S13). When the value of the termination code is "0" (S13/0), the process takeover means 22 sets "OK" for the value of the process takeover determination (S14) and returns the value of the process takeover determination to the process takeover means 12 (S16). After that, the takeover process is generated in the clustering device 21 of the standby system by using the existing technology of the clusterware and the service processing is taken over. On the other hand, when the value of the termination code is not "0" (S13/otherwise), the process takeover means 22 sets "NG" for the value of the process takeover determination (S15) and returns the value of the process takeover determination to the process takeover means 12 (S16).

[Effects of the Exemplary Embodiment]

According to the exemplary embodiment, even if the process does not support the hot standby, the resources required when operating the takeover process corresponding to the process 15 in the clustering device 21 can be secured in advance, without programming. The reason is because the resource utilization status of the process 15 is obtained in the clustering device 11, it is shared between the process information sharing means 14 and 24, and the standby process 25 acquires the resources based on its information.

Further, according to the exemplary embodiment, when the shortage of the amount of resources required for operating the process 15 in the clustering device 21 occurs, the prevention can be achieved in such a way that the process 15 is not taken over. The reason is because it is checked whether the takeover process corresponding to the process 15 can operate in the clustering device 21 through the resource acquisition processing by the standby process 25.

[Third Exemplary Embodiment]

Figure 8:
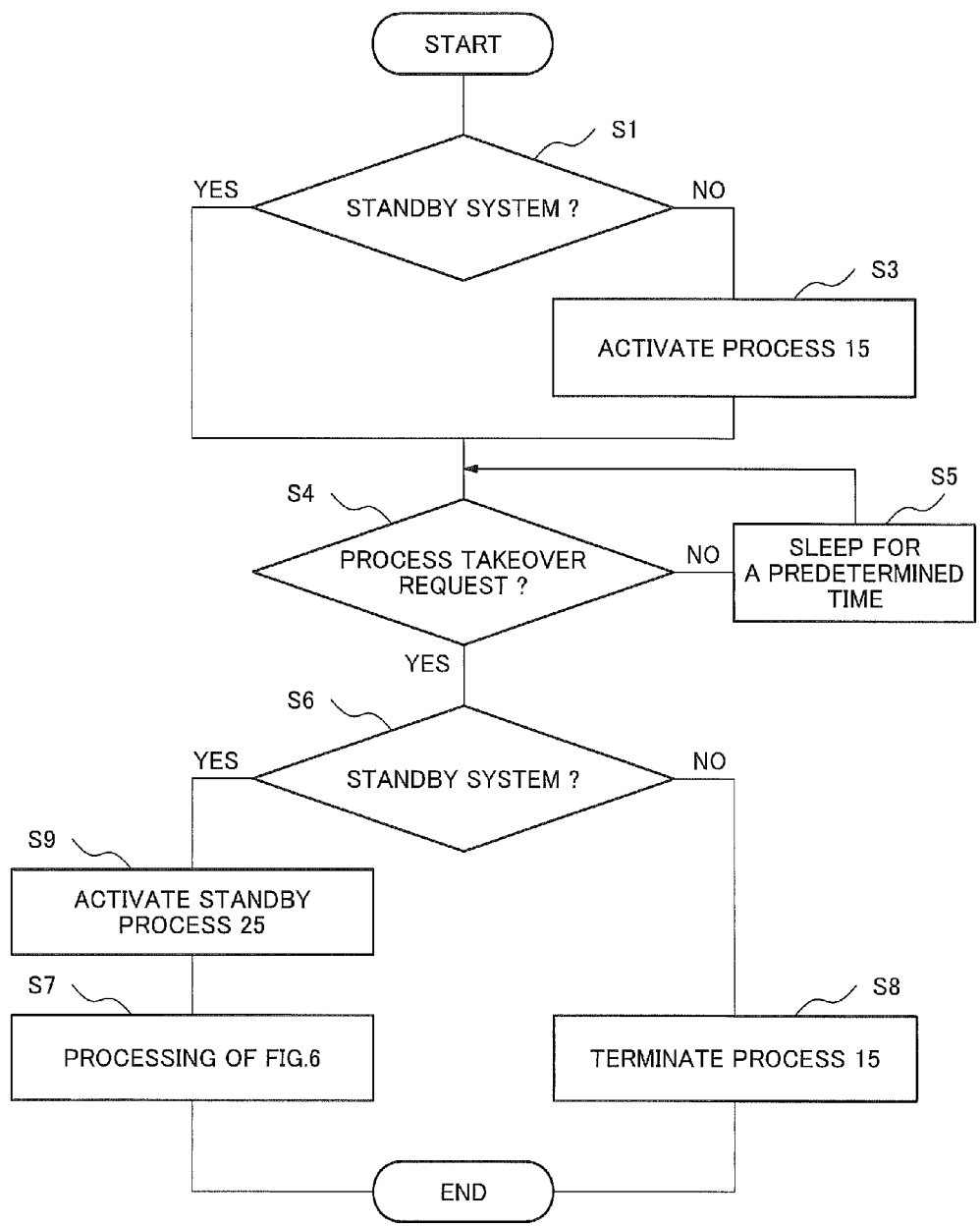
FIG. 8 is an exemplary flow chart showing process activation processing in a cluster system according to a third exemplary embodiment of the present invention.

In this exemplary embodiment, processing shown in FIG. 8 is performed instead of the processing shown in FIG. 5 in the second exemplary embodiment. In the exemplary embodiment, after the process takeover request occurs, the clustering device 21 of the standby system activates the standby process 25 (S9) and after this, performs the processing shown in FIG. 6. Namely, in the exemplary embodiment, when the process takeover means 22 receives the process takeover request, the resource acquisition processing is performed by the standby process 25 and it is confirmed whether or not the process takeover can be performed.

According to the above-mentioned technology disclosed in Japanese Patent Publication No. 3248485 or the like, a risk of the failure of the takeover caused by the shortage of resources of the standby system device can be reduced. However, it is difficult to secure the amount of resources required for the takeover until the time of the takeover by only monitoring whether or not the necessary and sufficient resources for the takeover exists in the standby system device. The reason is because there is a possibility that the resources are assigned to another process that is not related to the takeover.

An exemplary advantage according to the invention is that the amount of resources required for the takeover in the standby system device can be secured until the time of the takeover.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A standby system device which is connected to an active system device comprising:
    a process information sharing unit which receives active side process information indicating usage of resources of an active system process operating on said active system device from said active system device; and
    a standby process management unit which terminates a standby process before activating a takeover process that is used for taking over processing of said active system process when a takeover of said active system process is requested on said standby system device, said standby process acquiring resources in such a way that usage of resources of said standby process is equal to or greater than said usage of resources of said active system process based on said active side process information.

2. The standby system device according to claim 1, wherein said standby process management unit activates said standby process before said takeover of said active system process is requested.

3. The standby system device according to claim 1, wherein said standby process management unit activates said standby process at a time at which said takeover of said active system process is requested.

4. The standby system device according to claim 1, wherein
    when said standby process receives a termination request, said standby process sets a predetermined value for a termination code and terminates said standby process, and when acquiring of said resources fails, said standby process sets a value different from said predetermined value for said termination code and terminates said standby process, and said standby process management unit determines whether or not taking over of said processing of said active system process has been performed based on a value of said termination code.

5. The standby system device according to claim 1, wherein said standby process management unit secures the resources required by the taking over processing in the standby system device until performing the taking over processing.

6. The standby system device according to claim 1, wherein the standby process management unit terminates the standby process on the standby system device before activating the takeover process when the takeover of the active system process operating on the active system device is requested.

7. A cluster system comprising: said active system device including a process information sharing unit which investigates usage of resources of an active system process operating on said active system device, and updates and transmits said active side process information; and said standby system device according to claim 1.

8. A control method of a standby system device connected to an active system device comprising:

receiving active side process information indicating usage of resources of an active system process operating on said active system device from said active system device; and terminating a standby process before activating a takeover process that is used for taking over processing of said active system process when a takeover of said active system process is requested on said standby system device, said standby process acquiring resources in such a way that usage of resources of said standby process is equal to or greater than said usage of resources of said active system process based on said active side process information.

9. A non-transitory computer readable storage medium recording thereon a program, causing a standby system device connected to an active system device to function as:

a process information sharing unit which receives active side process information indicating usage of resources of an active system process operating on said active system device from said active system device; and a standby process management unit which terminates a standby process before activating a takeover process that is used for taking over processing of said active system process when a takeover of said active system process is requested on said standby system device, said standby process acquiring resources in such a way that usage of resources of said standby process is equal to or greater than said usage of resources of said active system process based on said active side process information.

10. A standby system device which is connected to an active system device comprising:

process information sharing means for receiving active side process information indicating usage of resources of an active system process operating on said active system device from said active system device; and standby process management means for terminating a standby process before activating a takeover process that is used for taking over processing of said active system process when a takeover of said active system process is requested on said standby system device, said standby process acquiring resources in such a way that usage of resources of said standby process is equal to or greater than said usage of resources of said active system process based on said active side process information.

* * * * *